United States Patent [19]

Reddy

[11] 4,240,382

[45] Dec. 23, 1980

[54] SPEED SENSITIVE ELECTRONIC FUEL CONTROL SYSTEM FOR AN INTERNAL COMBUSTION ENGINE

[75] Inventor: Junuthula N. Reddy, Troy, Mich.

[73] Assignee: The Bendix Corporation, Southfield, Mich.

[21] Appl. No.: 901,379

[22] Filed: May 1, 1978

[51] Int. Cl.³ ............................................... F02B 3/04
[52] U.S. Cl. .................................... 123/485; 123/478
[58] Field of Search ......... 123/32 EA, 32 EB, 32 EC, 123/117 A, 117 D

[56] References Cited

U.S. PATENT DOCUMENTS

| 3,727,081 | 4/1973 | Davis et al. ................ 123/32 EA X |
| 3,771,502 | 11/1973 | Reddy ............................ 123/32 EA |
| 3,909,601 | 9/1975 | Yamawaki et al. ............. 123/32 EB |
| 3,919,981 | 11/1975 | Reddy ......................... 123/32 EA X |
| 3,921,610 | 11/1975 | Hartig ............................. 123/117 D |
| 4,133,323 | 1/1979 | Adler .............................. 123/117 R |
| 4,195,599 | 4/1980 | Luchaco ........................ 123/32 EA |

Primary Examiner—Tony M. Argenbright
Attorney, Agent, or Firm—James R. Ignatowski; Russel C. Wells

[57] ABSTRACT

The invention is an electronic fuel control system for an internal combustion engine having a first capacitance which is charged to a value indicative of the engine's speed during a first rotational interval of the engine. At the end of the rotational interval, a potential indicative of the charge on the first capacitance is transferred to a second capacitance which is further charged at a predetermined rate during a second rotational interval. A comparator compares the value of the potential on the second capacitance with a signal indicative of the engine's load. The comparator generates a pulse width signal indicative of the engine's fuel requirements during the interval the potential on the second capacitance is less than the value of the load signal.

18 Claims, 8 Drawing Figures

*Fig-1*

(PRIOR ART)

SPEED SENSITIVE ELECTRONIC FUEL CONTROL SYSTEM FOR AN INTERNAL COMBUSTION ENGINE

BACKGROUND OF INVENTION

1. Cross Reference

This Application is related to my commonly-assigned U.S. Pat. No. 3,734,068, "Fuel Injection Control System", issued May 22, 1973, my co-pending commonly-assigned U.S. application for Patents Ser. Nos. 226,486 entitled "RPM Information Signal Generating Circuitry for Electronic Fuel Control System" filed Feb. 15, 1972, 226,496 "Electronic Fuel Control System Including Means for Providing a Continuous Variable Correction Factor" filed Feb. 15, 1972, 729,317 "Roughness Sensor" filed Oct. 4, 1976, now Pat. No. 4,092,955, and commonly-assigned Application 790,625 "A Speed Sensitive Electronic Fuel Control System for an Internal Combustion Engine" filed Apr. 23, 1977, now Pat. No. 4,195,599. The disclosures of each of the above cross-referenced cases being expressly incorporated herein by reference.

2. Field of Invention

The invention is related to electronic fuel control systems for internal combustion engines and in particular to speed sensitive electronic fuel control systems of the type taught in U.S. Pat. No. 3,734,068, and my pending applications Ser. Nos. 226,486 and 226,498 cited above using the charge transfer circuit of the type disclosed in my commonly-assigned co-pending application Ser. No. 729,317.

3. Prior Art

Figure 1:
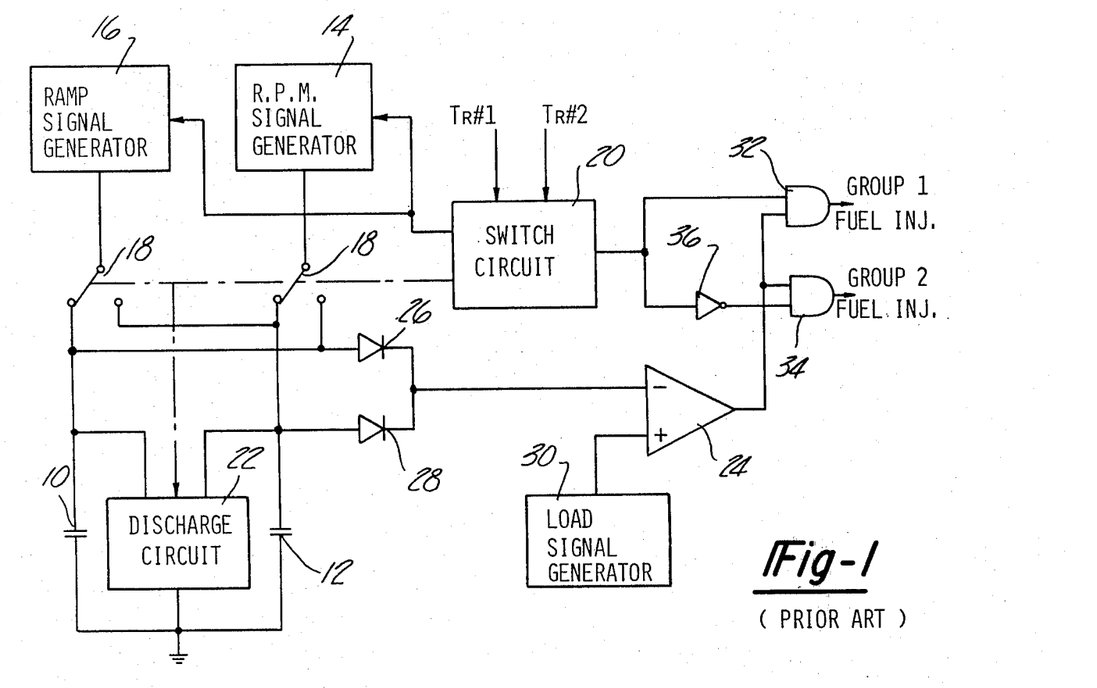
FIG. 1 is a block diagram of the prior art fuel control system as taught by Reddy in U.S. Pat. No. 3,734,068.

The speed sensitive electronic fuel control disclosed by Reddy in U.S. Pat. No. 3,734,068 and improvements thereto as disclosed in patent application Ser. Nos. 226,486 and 226,498 cited above, is illustrated in FIG. 1. This system embodies two capacitances 10 and 12 which are sequentially charged from two current sources respectfully designated RPM Signal Generator 14 and Ramp Signal Generator 16. Electronically actuated switches, illustrated by mechanical ganged switch 18, controlled by an output signal from Switch Circuit 20, connects the two signal generators 14 and 16 to capacitances 10 and 12 in a manner so that when capacitance 10 is being charged by the RPM Signal Generator 14, capacitance 12 is being charged by Ramp Signal Generator 16 and vice versa. In this manner, both capacitances are sequentially charged, first by the output of the RPM Signal Generator 14, then by the output of the Ramp Signal Generator 18. At the end of each sequential charging period, the capacitance having been last charged by the output from the Ramp Signal Generator 16 is discharged by means of a Discharge Circuit 22 to a predetermined value prior to the initiation of a new charging sequence.

The Switch Circuit 20 may be a simple bi-stable flip-flop producing a square wave output signal in response to trigger signals designated TR 1 and TR 2. These trigger signals may be derived from the engine's crankshaft, flywheel or ignition system, and are indicative of predetermined angular positions of the engine, normally 180° apart. Switch 18 responds to this square wave signal and assumes a first position in response to the positive portion and a second position in response to the ground or negative portion of the signal. Discharge Circuit 22 responds to the positive and negative transitions of the square wave and discharges the appropriate capacitance. The potential developed across both capacitances as they are being charged are communicated to the negative input of Comparator 24 by means of diodes 26 and 28. The output of a Load Signal Generator 30 is applied to the positive input to the Comparator 24. The Load Signal Generator 30 may be a pressure sensor generating a signal indicative of the pressure in the engine's air intake manifold as taught by Reddy in U.S. Pat. No. 3,734,068 or any other sensor generating a signal indicative of the engine's load.

The output of the comparator 24 is connected in parallel to the inputs of two AND gates 32 and 34. The square wave output of the Switch Circuit 20 is applied directly to the alternate input of AND Gate 32 and indirectly to the alternate input of AND Gate 34 by means of an Inverting Amplifier 36. Alternately, the reciprocal or complementary square wave signal generated by the flip-flop may be applied directly to AND Gate 34.

Figure 2A:
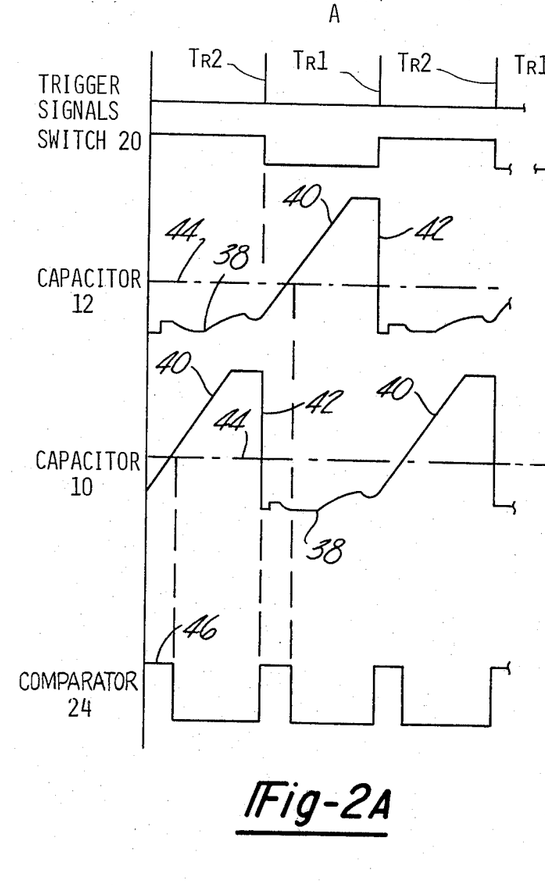
FIG. 2A is a series of waveforms used to discuss the operation of the system illustrated in FIG. 1 at a low engine speed.

The operation of this prior art circuit is described with reference to FIG. 1 and the waveforms shown on FIGS. 2A and 2B. It is assumed the Switch Circuit 20 is triggered by trigger signal TR 1 and its initial output signal is positive as shown on FIG. 2A. The positive output signal from the Switch Circuit 20 actuates switch 18 to the position shown on FIG. 1, activates Discharge Circuit 22 to discharge capacitance 12 to the predetermined value and enables AND Gate 32. Gates 32 or 34 communicate the output of the Comparator 24 to either Fuel Injector Group 1 or Group 2 depending upon which of the two AND gates is enabled by the square wave signal generated by the Switch Circuit 20.

Figure 2B:
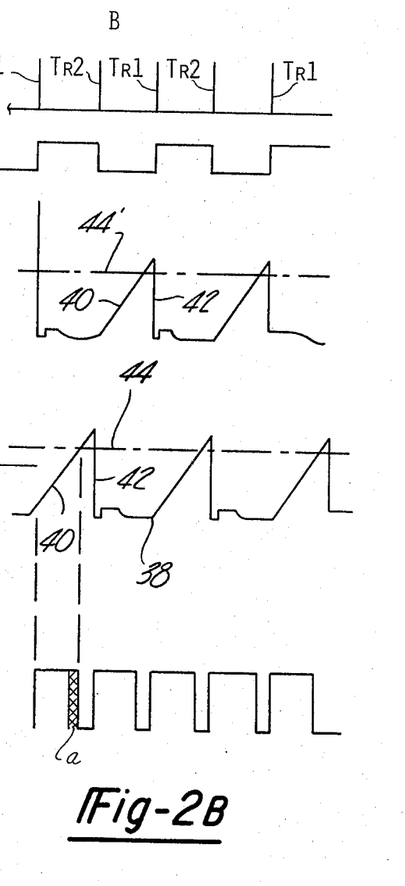
FIG. 2B is a series of waveforms used to discuss the operation of the system illustrated in FIG. 1 at a higher engine speed.

The waveforms shown on FIG. 2B illustrate the change in the output 46 from the Comparator 24 when the engine speed has increased accompanied by an increase in the value of the load signal 44. The positive portion of the signal 46 is changed by two factors. Increasing the value of the load signal increases the positive portion of the Comparator's output by a first factor designated by the cross hatches area designated "a" indicative of the increased time it takes for the potential across capacitances 10 or 12 to reach the higher value of the load signal 44. The positive portion of the output signal generated by the Comparator 24 may also be changed as a function of engine speed since the final value of the charge capacitances 10 or 12 during the first interval varies with time. Obviously, if the only change in the waveforms illustrated on FIG. 2B was an increase in engine speed without a corresponding change in the load signal, the positive portion of the output from Comparator 24 would increase or decrease depending on whether the voltage on capacitance 10 or 12 at the end of the first charging is lower or higher than the voltage at the prior lower speed. The change in the output signal would be indicative of the change in the value of the charge on capacitance 10 or 12 at the end of the first charging period. Conversely, if the only change was an increase in the load signal without a corresponding change in the engine speed, the change in the positive portion of the output from Comparator 24 would only be proportional to the difference in time it would take the Ramp Signal Generator to charge either capacitance to the new value of the load signal.

Although this circuit works extremely well, it requires that the two capacitances 10 and 12 be a matched pair (identical) which require that they be tested prior to assembly to assure that the output signals generated by the Comparator 24 will be identical within permitted tolerances. Further since both capacitances are charged by both the RPM and Ramp Generators, a severe restraint is placed on both signal generators to produce the desired waveforms. The disclosed invention eliminates both of these deficiencies.

SUMMARY

The invention is an improved fuel control system of the type taught by Reddy in U.S. Pat. No. 3,734,068 and patent applications Ser. Nos. 226,486 and 226,498, in which the signal generated by a first signal generator charges a first capacitance to a value indicative of engine speed during a first predetermined interval of the engine's angular rotation. At the end of the first predetermined interval, a charge transfer circuit of the type disclosed in my above-referenced application Ser. No. 729,317 discharges the second capacitance to the potential on the first capacitance in response to a transfer signal generated by a switch signal circuit responding to signals indicative of the engine's rotational position.

Effectively, the potential on the first capacitance is transferred to the second capacitance. During a second predetermined interval, the second capacitance is charged by a second signal generator at a predetermined rate to a value well above the potential of the transferred charge. A comparator, compares the potential on the second capacitance with a signal indicative of the engine's load and generates an output indicative of the engine's fuel requirements. Output gates receiving the output signal, a distribution signal generated by the switch signal circuit and the transfer signal, distributes the output signals to the proper fuel injector valves corrected for the duration of the transfer signal.

The object of the invention is a speed sensitive electronic fuel control system in which the charge on the first capacitance indicative of the engine's speed is transferred to a second capacitance which is subsequently charged at a predetermined rate to the value of the load signal.

Another object of the invention is a fuel control circuit in which the two capacitances do not have to be a matched pair.

Another object of the invention is a fuel control system in which the value of the two capacitances do not have to be equal.

A final object of the invention is a fuel control system in which the output signal generated by the two signal sources are not constrained by the requirement that both capacitances have the same value.

These and other objects will become apparent from a reading of the Detailed Description of the invention in conjunction with the drawings.

DETAILED DESCRIPTION OF THE INVENTION

Figure 3:
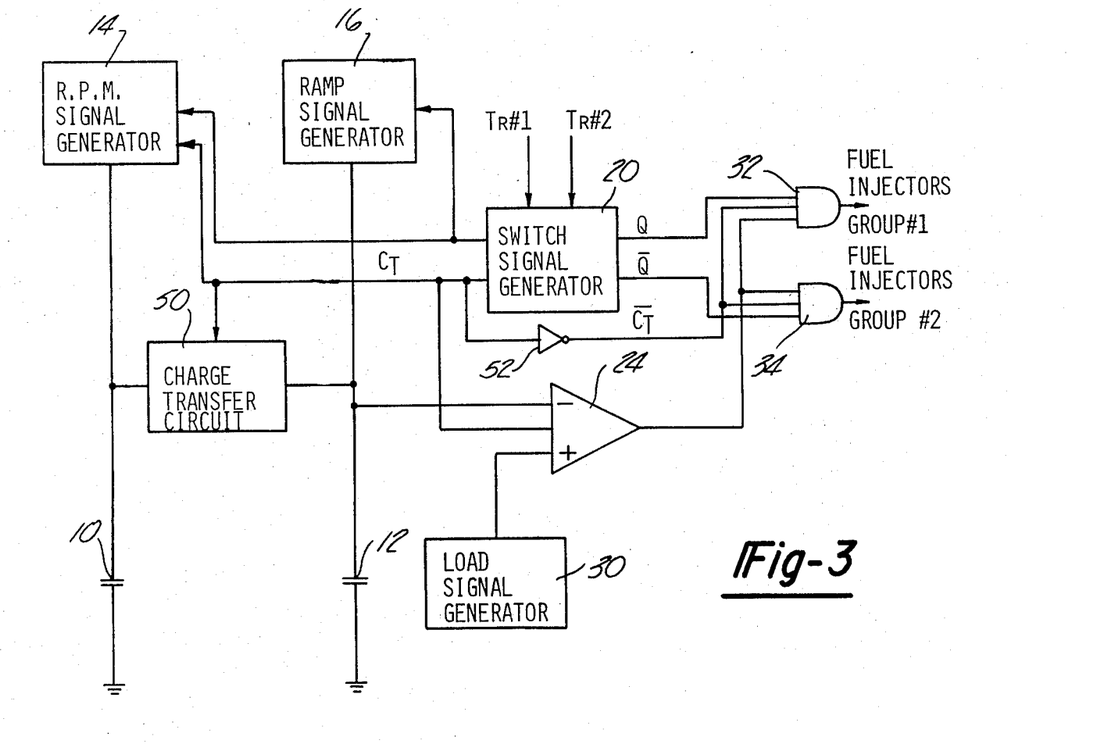
FIG. 3 is a block diagram of the preferred embodiment of the disclosed system.

Referring to FIG. 3, there is shown a block diagram of the improved fuel control system of the type disclosed by Reddy in U.S. Pat. No. 3,734,068, including the RPM signal generator disclosed in U.S. applications Ser. Nos. 226,486 and 226,498. For continuity purposes, common elements between this improved fuel control system and those of the prior art discussed with reference to FIG. 1 have the same identifying indicia. A comparable RPM Signal Generator 14 generates a reference signal which charges a first capacitance 10 to a potential having a value indicative of the engine's speed. As discussed with reference to FIG. 1, the RPM signal may be dual valued as taught by Redddy in patent 3,734,068 or may vary as a function of time as taught in commonly-assigned co-pending patent Application Ser. Nos. 226,486 and 226,498. A transfer circuit 50 is connected between the first capacitance 10 and a second capacitance 12 and transfers the potential stored on capacitance 10 to capacitance 12 in response to a charge transfer ($C_T$) signal generated by a Switch Signal Generator 20. Capacitance 12 is further charged by a ramp signal generated by a Ramp Signal Generator 16. The ramp signal may be single valued as taught by Reddy in patent 3,734,068 or may vary as a function of time as shall be discussed hereinafter. The potential generated across capacitance 12 as it is charged by the Ramp Signal Generator 16 is communicated to the negative input of a Comparator 24 which also receives a load signal at its positive input from a Load Signal Generator 30. The Load Signal Generator 30 may be a pressure sensor generating a signal indicative of the pressure in the engine's air intake manifold or any other type of sensor generating a signal indicative of the engine's load as is known in the art. The output of the Comparator 24 is connected to the inputs of AND Gates 32 and 34. The alternate inputs of the AND Gates 32 and 34 receive complementary flip-clops designated Q and $\overline{Q}$ from the Switch Signal Generator 20 which enables AND Gates 32 and 34 in an alternating sequence. The inverse of the charge transfer signal ($\overline{C}_T$) generated by inverter amplifier 52, is also applied to alternate inputs to AND Gates 32 and 34 and inhibit the AND gates during the period when the charge transfer signal is being generated. This synchronizes the generation of the pulse signals transmitted by the AND Gates 32 and 34, with the beginning of the ramp signal generated on capacitance 12 as shall be explained hereinafter.

The Switch Signal Generator 20 receives trigger signals TR #1 and TR #2 generated by a trigger signal generator (not shown). The trigger signals TR #1 and TR #2 are generated as a function of the angular rotational position of the engine's crankshaft, and are normally 180° apart. These signals may be derived from sensors detecting the rotational position of the crankshaft itself such as cam actuated reed switches, or may be magnetic pick up detecting the position of the crankshaft or flywheel. Alternately, the trigger signals may be generated by an inductive pick up detecting the ignition signals or any other means known in the art.

Figure 4:
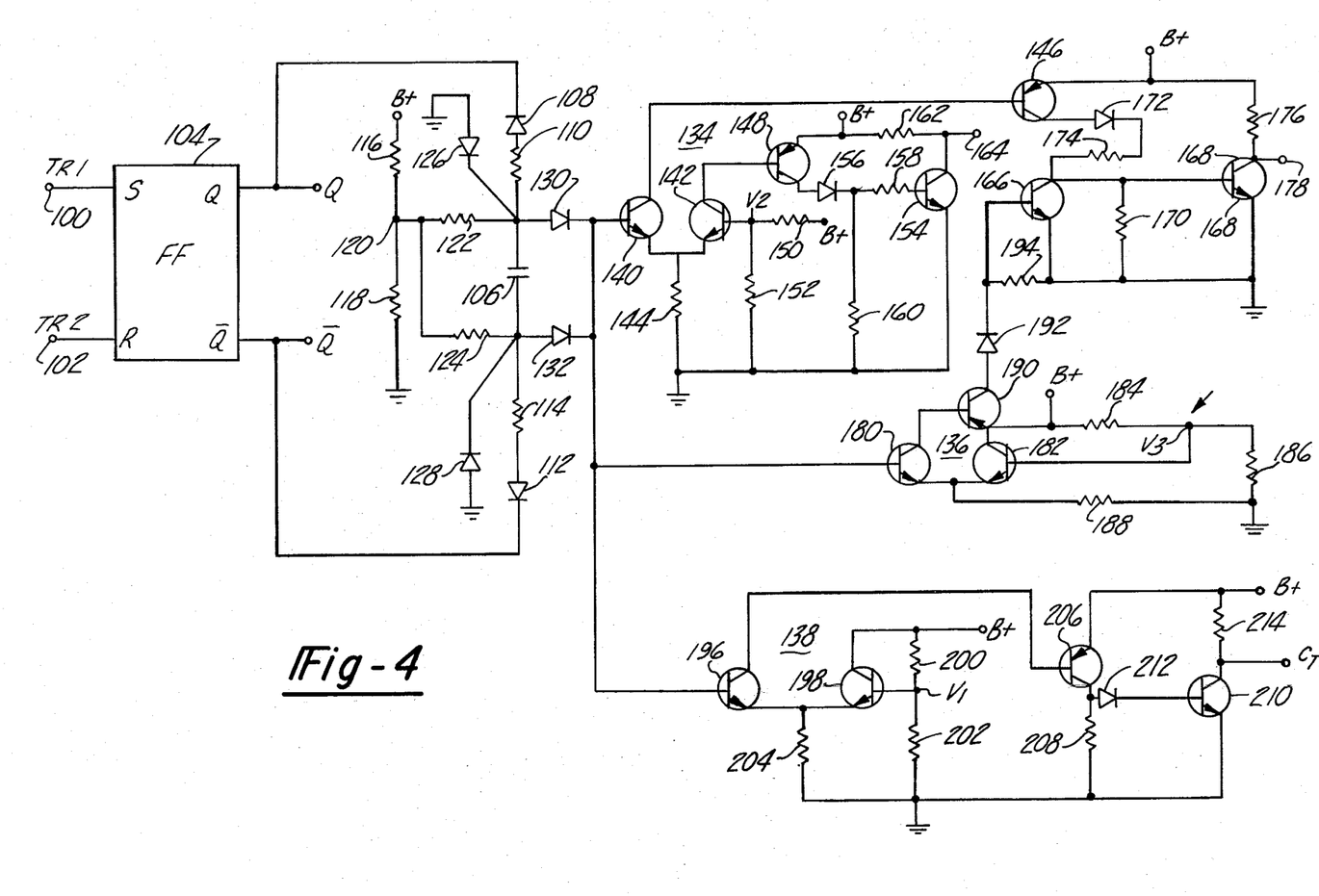
FIG. 4 is a circuit diagram of the switch signal generator described with reference to FIG. 3.

FIG. 4 is a circuit diagram of the Switch Signal Generator 20 shown in block form on FIG. 3. The circuit receives electrical power at various locations designated B+ on circuit diagram. This source of electrical power may be a battery or engine driven alternator or generator as is known in the art. The symbols B+ and ground, as used in FIGS. 4, 6 and 7 have their conventional meaning and represent the positive and negative terminals of the source of electrical power respectively. The trigger signals TR1 and TR2 are received at input terminals 100 and 102 respectively which are connected to the Set (S) and reset (R) inputs of an SR flip-flop 104. The S/R flip-flop 104 is of a conventional design and produces a positive signal at the Q output and a negative or ground signal at the $\overline{Q}$ output in response to an input at the set (S) terminal. The SR flip-flop 104 is reset by an input to the reset (R) terminal and the signals at the outputs invert and the $\overline{Q}$ output becomes a positive signal and the Q output becomes a negative or ground signal. The outputs of the SR flip-flop 104 are applied directly to the terminals designated Q and $\overline{Q}$. The Q output of the SR flip-flop 104 is applied to one electrode of a capacitance 106 by means of a diode 108 and a resistance 110. The $\overline{Q}$ output is applied to the other electrode of capacitance 106 by means of a diode 112 and a resistance 114. A voltage divider network comprising resistance 116 and 118 connected between B+ and ground generates an intermediate voltage at the junction 120 between the two resistances. Junction 120 is connected to the one side of the capacitance 106 by a resistance 122 and to the other side of the capacitance 106 by a resistance 124. The opposite electrodes of the capacitor 106 are biased with reference to ground by means of diodes 126 and 128. Diodes 130 and 132 are connected from the opposite electrodes of capacitance 106 to the inputs of three comparator circuits generaly designated 134, 136 and 138. Comparator 134 comprises transistors 140 and 142 having their emitters connected in common and to ground through a resistance 144. The collector of transistor of 140 is connected to the base of transistor 146 which has its emitter connected directly to B+. Transistor 142 has its collector connected to the base of transistor 148 having its emitter connected directly to B+. The base of transistor 142 is connected to a voltage divider network consisting of resistances 150 and 152 connected in series between B+ and ground. The base of transistor 140 is connected to the cathodes diodes 130 and 132.

The collector of transistor 148 is connected to the base of transistor 154 by means of diode 156 and resistance 158. The junction between diode 156 and resistance 158 is connected to ground through a resistance 160. The collector of transistor 154 is connected to B+ through a resistance 162 and the emitter of transistor 154 is connected directly to ground. An output terminal 164 is connected to the junction between resistance 162 and the collector of transistor 154.

The collector of transistor 146 is connected to the collector of transistor 166, and the base of transistor 168 through diode 172 and resistance 174. The base of transistor 168 and the collector of transistor 166 are connected to ground through resistance 170. The emitters of transistors 166 and 168 are connected directly to ground. The collector of transistor 168 is connected to B+ by means of a resistance 176. An output terminal 178 is connected to the junction between resistance 176 and the collector of transistor 178.

The comparator 136 comprises a transistor 180 having its base connected to the cathodes of diodes 130 and 132 and a transistor 182 having its base connected to the junction between resistances 184 and 186 forming a voltage divider network between B+ and ground. The emitters of transistors 180 and 182 are connected in common and to ground through a resistance 188. The collector of transistor 180 is connected to the base of transistor 190 having its emitter connected directly to B+. The collector of transistor 190 is connected to the base of transistor 166 by means of diode 192 and to ground by means of diode 192 and resistance 194.

Comparator 138 comprises transistor 196 having its base connected to diodes 130 and 132 and transistor 198 having its base connected to the junction between resistances 200 and 202 forming a voltage divider network between B+ and ground. The emitters of transistors 196 and 198 are connected in common and to ground through a resistance 204. The collector of transistor 198 is connected directly to B+ while the collector of transistor 196 is connected to the base of a transistor 206 having its emitter connected directly to B+. The collector of transistor 206 is connected to ground through a resistance 208 and to the base of a transistor 210 by means of a diode 212. The emitter of transistor 210 is connected directly to ground and the collector is connected to B+ through a resistance 214. An output terminal designated $C_T$ is connected to the junction between resistance 214 and the collector of transistor 210.

Figure 5:
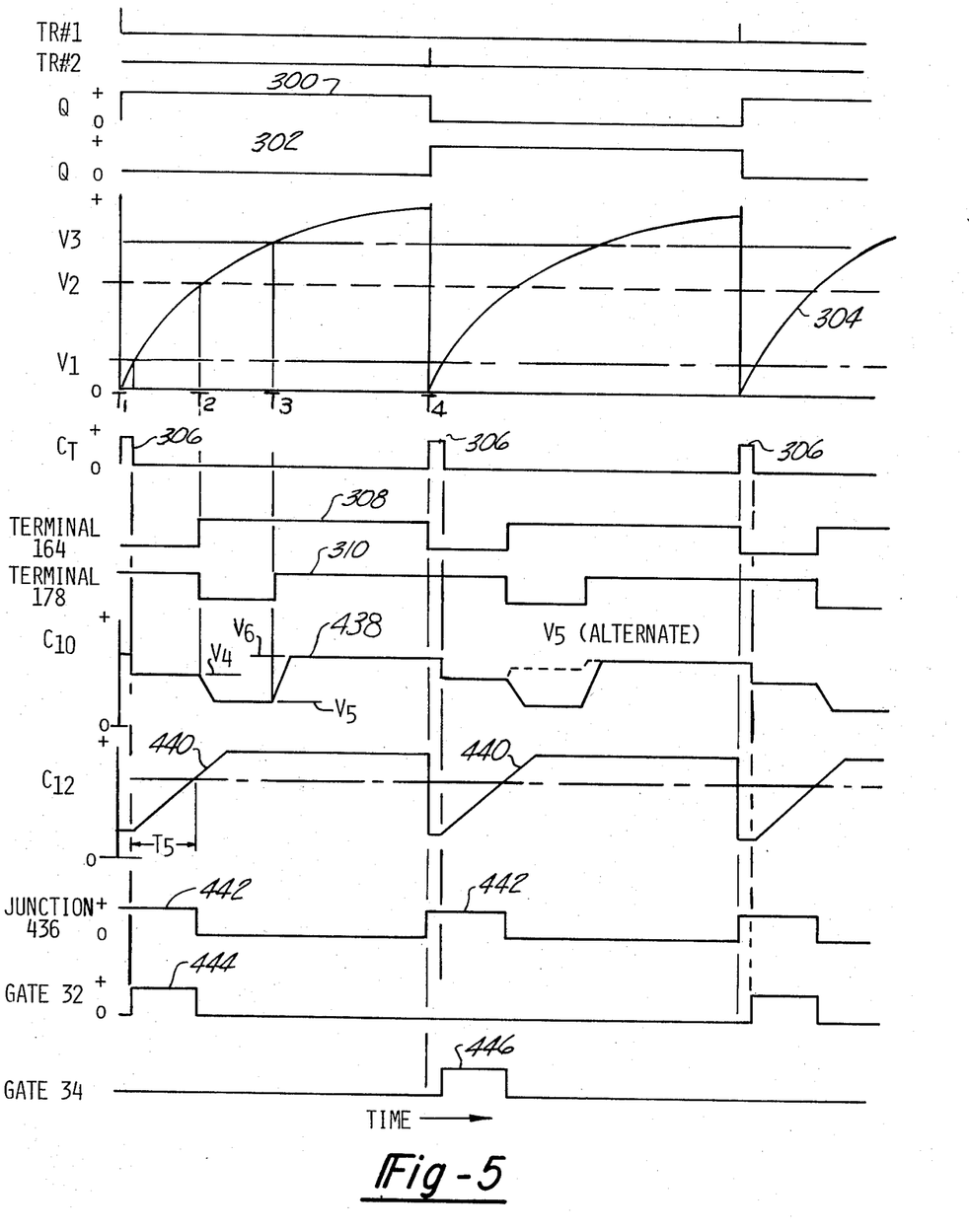
FIG. 5 is a series of waveforms used in explaining the operation of the circuit shown on FIGS. 4, 6 and 7.

The operation of the switch signal generator will be discussed with reference to FIG. 4 and waveforms shown on FIG. 5. Referring to FIG. 4, the trigger signals TR #1 and TR #2 in the form of short pulses are alternately received at the set and reset inputs of the SR flip-flop 104 which cause the flip-flop to produce complementary square wave signals at the outputs designated Q and $\overline{Q}$. In response to trigger signal TR #1 at the S input of the SR flip-flop 104, the Q output goes positive and the $\overline{Q}$ output goes negative. When the $\overline{Q}$ output goes negative, capacitance 106 is discharged through resistance 114 and diode 112. The opposite electrode of capacitance 106 would attempt to assume a negative potential but is maintained at a near ground potential by means of diode 126 connected to ground. The opposite electrode of capacitance 106 is now charged through resistances 116 and 122 which forms a ramp signal 304, shown on FIG. 5, communicated to the bases of transistors 140, 180 and 196 by means of diode 130. The ramp signal 304 may be non-linear as shown or may be a linear function of time. The near ground signal at the anode of diode 132 caused by the ground signal at the $\overline{Q}$ output of flip-flop 104 back biases this diode.

Immediately following the switching of the flip-flop 104, the signal applied to the inputs of transistor 140, 180 and 196 through diode 130 is a ground potential signal. The voltage $V_1$ applied to the base of transistor 198 by means of voltage divider comprising resistances 200 and 202 causes transistor 198 to conduct, and establish a potential at the junction between the emitters of transistors 196 and 198 and resistance 204 approximately equal to $V_1$. This potential applied to the emitter of transistor 196 causes transistor 196 to remain blocked as long as the ramp signal 304 applied to the base of transistor 196 by diode 130, is less than $V_1$. The blocking of transistor 196 prohibits base current from flowing in transistor 206, rendering it non-conductive also. This places a ground signal at the base of transistor 210 which also becomes non-conductive and a positive signal approximately equal to B+ appears at the output terminal designated $C_T$. After a period of time $T_1$, the ramp signal 304 has increased to a value equal to $V_1$. When the ramp signal 304 exceeds $V_1$, transistor 196 conducts which turns off transistor 198. The conductance of transistor 196 provides base current for transistor 206 causing it to conduct. The conductance of transistor 206 provides base current to transistor 210 causing it to conduct. The conductance of transistor 210 causes the potential at the output terminal designated $C_T$ to approach a ground potential and terminates the charge transfer ($C_T$) signal. The output at the terminal designated $C_T$ is a series of short duration charge transfer pulses designated 306 on the waveforms of FIG. 5.

The remainder of the switch signal generator circuit generates the signals which control the operation of the RPM signal generator 14 charging capacitance 10. The operation of this portion of the circuit is as follows: The voltage divider comprising resistances 150 and 152 establishes a potential $V_2$ at the base of transistor 142 which produces a voltage approximately equal to $V_2$ at the junction between the emitters of transistors 140 and 142 and resistance 144. The potential across capacitance 106, as it is charged through resistances 116 and 122 or 116 and 124 is communicated to the base of transistor 140 through diodes 130 and 132 respectively. When the voltage across capacitance 106 is less than the potential $V_2$, transistor 140 is blocked which in turn blocks transistor 146, which in turn blocks transistor 168 and the potential at the output terminal 178 assumes a positive potential. When transistor 140 is blocked, transistor 142 is conductive, providing base current for transistor 148, which in turn becomes conductive. The conductance of transistor 148 provides a base current to transistor 154 causing it to become conductive. When transistor 154 conducts, the potential at the output terminal 164 assumes a ground potential. After a period of time $T_2$, the potential across capacitance 106 exceeds the potential $V_2$ appearing at the emitter of transistor 140. When the potential at the base of transistor 140 exceeds the potential at its emitter, transistor 140 conducts providing base current for transistor 146 causing it to conduct. When transistor 146 conducts, it provides a base current for transistor 168 through diode 172 and resistance 174 causing transistor 168 to conduct. The conductance of 168 causes its collector to assume a ground potential which is communicated to the output terminal 178.

The conductance of transistor 140 causes the potential at the junction between the emitters of transistors 140 and 142 and resistance 144 to increase above the potential $V_2$ blocking transistor 142. When transistor 142 is blocked, the base current to transistor to 148 is terminated and blocks transistor 154 causing the potential at the collector of transistor 154 to go positive which is communicated to output terminal 164. The terminal 164 will maintain this positive output until the flip-flop 104 is triggered to change state, at which time the potential across capacitance 106 is reduced to a ground potential, causing transistor 140 again to become blocked.

A potential $V_3$ generated by the voltage divider network comprising resistances 184 and 186 is applied to the base of transistor 182, causing it to conduct and generating a potential at the junction between the emitters of transistors 180 and 182 and resistance 188 to assume a voltage approximately equal to $V_3$. When the potential across capacitance 106 exceeds the potential $V_3$ at the emitter of transistor 180, transistor 180 starts to conduct providing a base current for transistor 190. This causes transistor 190 to conduct and provide a base current to transistor 166 through diode 192. The conductance of transistor 166 places a ground potential at the base of transistor 168, causing it to become non-donductive. When transistor 168 becomes non-conductive, the potential at the collector of transistor 168 and output terminal 178 assumes a positive potential. The output signals at terminals 164 and 178 are shown on the waveforms of FIG. 5. The signal at output terminal 164 is a ground signal until the voltage across capacitance 106 has been charged to a potential greater than the voltage $V_2$. When the potential across capacitance 106 exceeds $V_2$, the signal at the output of terminal 164 goes positive and remains positive until the capacitance 106 is discharged by the change of state of flip-flop 104. When flip-flop 104 changes state, the output at terminal 164 goes back down to a ground potential and remains at the ground potential until capacitance 106 is charged to a potential greater than $V_2$. This output is depicted as waveforms 308 on FIG. 5.

The signal at output terminal 178 is a positive signal immediately after flip-flop 104 changes state and remains at this positive potential until the potential across capacitance 106 exceeds the potential $V_2$. When the potential across capacitance 106 exceeds $V_2$, transistors 140, 146 and 168 become conductive and the potential at the output of terminal 178 becomes a ground signal. The potential at terminal 178 remains a ground signal until the potential across capacitance 106 exceeds the potential $V_3$. At this time, transistor 180, 190 and 166 become conductive, and transistor 168 becomes non-conductive causing the potential at the terminal 178 to return to be a positive potential. The potential at terminal 178 remains positive until after flip-flop 104 changes state and the capacitance 106 has recharged to a value approximately to $V_2$. The signal at the output 178 is shown as waveform 310 on FIG. 5.

Figure 6:
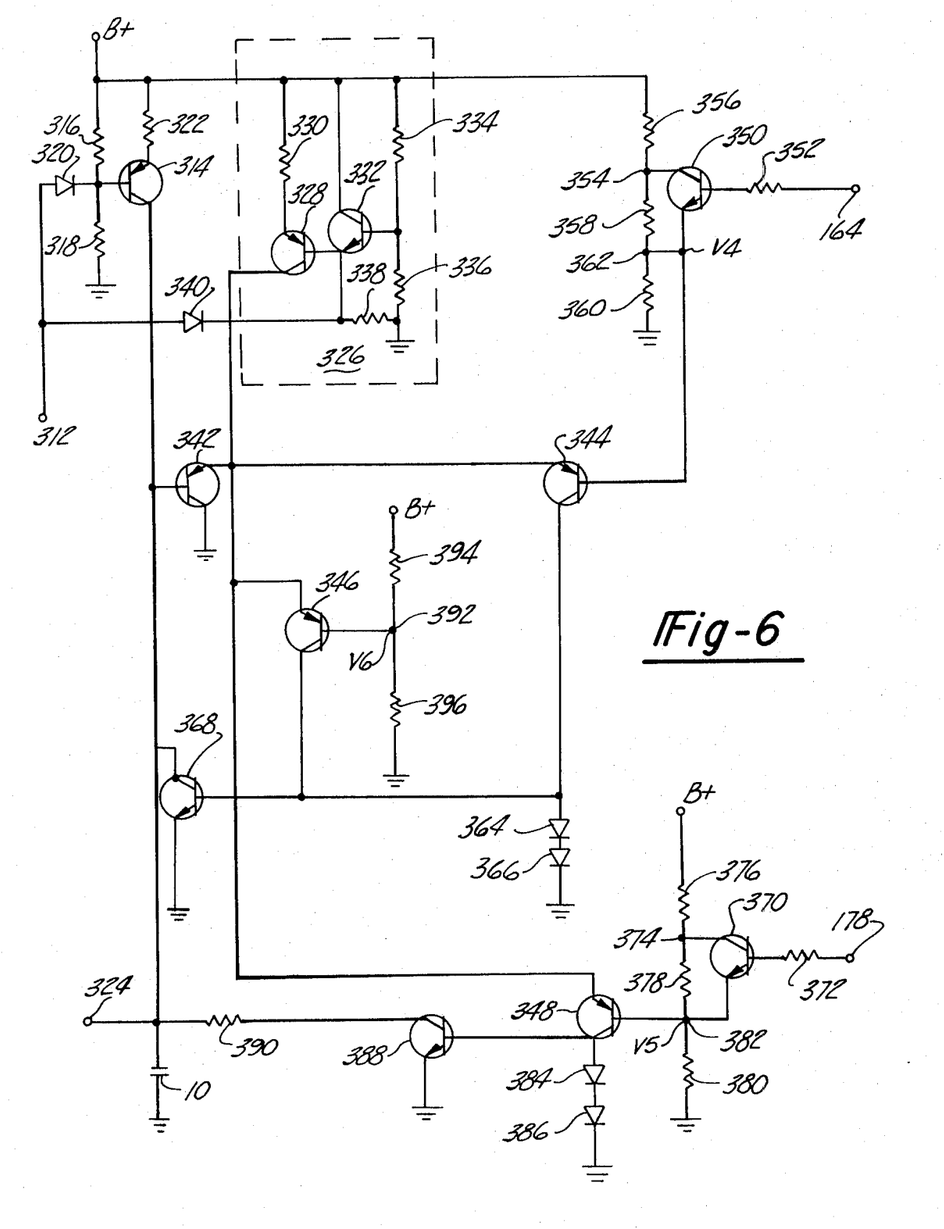
FIG. 6 is a circuit diagram of the RPM Signal Generator.

Referring now to FIG. 6 which is a detailed electrical schematic of the RPM signal generator 14, the circuit is powered by a voltage B+ from the electrical power supply at the various terminals designated B+ as previously discussed. The $C_T$ input generated by the switch signal generator 20 is appllied to terminal 312 while the input signals from terminals 164 and 178 are applied at the terminals designated 164 and 178 respectively. The base of a transistor 314 is connected to the mid-point of the voltage divider comprising resistances 316 and 318. The base of transistor 314 also receives the CT signal appearing on terminal 312 through a diode 320. The emitter of transistor 314 is connected to B+ through resistance 322 and the collector is collected to one electrode of capacitance 10 while the other electrode of capacitance 10 is connected directly to ground. The signal on capacitance 10 is connected to terminal 324 which in turn is connected to the Transfer Circuit 50. Transistor 314 and resistances 316, 318 and 322 comprise a constant current source charging capacitance 10. A regulated current surce 326 comprising transistor 328 having its emitter connected to B+ through a resistance 330 and transistor 332 having its collector connected directly to B+ and its base connected to the mid-point of a voltage divider network comprising resistance 334 and 336. The emitter of transistor 332 is connected to the base of transistor 328 and to ground through resistance 338. The commonly connected emitter and base of transistors 332 and 328 are also connected to terminal 312 and receives the CT pulse through a diode 340. The collector of transistor 328 is connected to the emitters of transistors 342, 344, 346 and 348.

Transistor 342 has its base connected to the one electrode of capacitance 10 and its collector connected directly to ground and serves to regulate the potential at the output of the current source 326 to the potential across capacitance 10.

A transistor 350 has its base connected to the input terminal 164 through resistance 352 and receives the switch signal appearing on terminal 164 from the switch signal generator 20. The collector of transisor 350 is connected to a junction 354 of a voltage divider network between B+ and ground comprising resistance 356, 358 and 360. The emitter of transistor 350 is connected to a junction 362 between resistances 358 and 360 and to the base of transistor 344. The collector of transistor 344 is connected ground through diodes 364 and 366 and to the base of a first sink transistor 368 having its collector connected to the one electrode of capacitance 10 and its emitter connected directly to ground.

A transistor 370 has its base connected to terminal 178 through resistance 372 and receives the signal at the output terminal 178 of the switch signal generator 20. The collector of transistor 370 is connected to a junction 374 between resistances 376 and 378. Resistances 376 and 378 in combination with a resistance 380 forms a voltage divider network between B+ and ground. The emitter of transistor 370 is connected to a junction 382 between resistances 378 and 380 and to the base of transistor 348. The collector of transistor 348 is connected to ground through diodes 384 and 386 and to the base of a second sink transistor 388. The emitter of second sink transistor 388 is connected directly to ground and the collector is connected to the one terminal of capacitance 10 through a resistance 390.

The base of a transistor 346 is connected to a junction 392 between resistance 394 and 396 forming a voltage divider network between B+ and ground. The collector of transistor is connected to ground through diodes 364 and 366 and the base of first sink transistor 368.

The operation of the circuit is discussed with reference to the waveforms on FIG. 5 and the circuit shown in FIG. 6. The charge transfer signal and the two signals that appear on the terminals 164 and 178 of the switch signals generator are applied to terminals 312, 164 and 178 respectively. The waveform of the charge transfer signals and the signals appearing at terminals 164 and 178 are as shown on the waveforms of FIG. 5. Immediately following flip-flop 104 in the switch signal generator 20 changing state, the charge transfer signal and the signal appearing at terminal 178 are positive and the signals appearing on terminals 164 is negative. The positive charge transfer signal applied to the base of transistor 314 immobilizes transistor 314 in constant current source charging capacitor 10 and the charge transfer signal applied to the base of transistor 328 immobilizes the regulated current source 326 and the sink transistors 368 and 388 controlling the charge on capacitor 10 so that the charge on capacitor 10 remains constant during the subsequent charge transfer. At times $T_1$, the charge transfer signal is terminated and both transistors 314 and 328 are unblocked and the source and sink generators returned to their normal mode of operation. The voltage at the collector of transistor 328 and applied to the emitters of transistors 342, 344, 346 and 348 is regulated to the voltage across capacitance 10 by the operation of transistor 342. Following the termination of the charge transfer signal, the potential applied to terminal 164 remains low and the potential applied to 178 remains high. The high potential at terminal 178 forward biases transistor 370 short circuiting resistance 378. Short circuiting resistance 378 increases the current flow through the voltage divider and the potential at junction 382 increases to a value which is higher than the maximum potential generated across capacitance 10 in the normal operation of the circuit. This potential being higher than the potential across capacitance 10, by operation of regulating transistor 342, it is also higher than the potential at the emitter of transistor 348. Transistor 348 is blocked, terminating the base current of transistor 388 which is now incapable of sinking any current from the capacitance.

Alternatively, the signal applied to terminal 164 is low, thereby blocking transistor 350. This causes the potential at the junction 362 between resistances 358 and 360 to be a potential $V_4$. When the potential $V_4$ applied to the base of transistor 344 is lower than the potential across capacitance 10 which is applied to the emitter transistor 344 by means transistor 342, transistor 344 conducts providing base current to the first sink transistor 368. This causes transistor 368 to conduct and discharge capacitance 10 until the voltage across capacitor 10 is approximately equal to the voltage $V_4$ at the junction 362. As long as the signal at terminal 164 remains low and the potential at terminal 178 remains high, the circuit remains in this condition and the charge on capacitor 10 is regulated to a value approximately equal to $V_4$. Conversely, if the potential $V_4$ applied to the base of transistor 344 is higher than the potential across capacitance 10, transistor 344 is blocked, thereby blocking first sink transistor 368. Capacitance 10 is then charged by the current source, transistor 314, until its potential is equal to $V_4$. The regulating action of transistors 342, 344 and 368 hold the potential across capacitance 10 at this value.

At time $T_2$, the signals applied to terminals 164 and 178 invert and the potential at terminal 164 goes high and the potential at terminal 178 goes low. The high potential at terminal 164 forward biases transistor 350 and the potential at junction 362 goes high. This effectively blocks transistor 344 which terminates the base current to transistor 368 and the regulation of the voltage across capacitor 10 to the potential $V_4$ at 362 is terminated. However, the low potential at terminal 178 blocks transistor 370 and the potential at the junction 382 now goes to a value $V_5$ which is less than its value with transistor 370 conducting. If the potential across capacitance 10 is less than the potential at the junction 382, transistor 348 is blocked blocking the second sink transistor 388 and capacitance 10 is charged by the current from transistor 314 until the potential across capacitor 10 is equal to the potential $V_5$ at junction 382. At this point, transistor 348 will start to conduct providing a base current to transistor 388 which will start to sink the current charging capacitor 10. The coordinated action of transistor 342, 348 and 388 will maintain the potential across capacitance 10 at approximately the potential $V_5$ occurring at the junction 382. Conversely, if the potential across capacitor 10 is higher than the potential at junction 382, which is reflected at the emitter of transistor 342, transistor 348 will conduct providing base current to the sink transistor 388 which will discharge capacitor 10 to a value approximately equal to the potential at junction 382.

After a third time period, $T_3$, the potential at the terminal 178 will again go positive causing transistor 370 to be conductive, raising the potential at junction 382 well above $V_5$. This higher potential at junction 382 will effectively block transistor 384 and sink transistor 388 terminating the sinking of the current being applied to capacitor 10. Capacitor 10 will now be charged by the current from the source transistor 314 until the potential across capacitor 10 is approximately equal to the potential $V_6$ at junction 392 between resistances 394 and 396. When the potential across capacitor 10 is approximately equal to this potential, transistor 346 starts to conduct providing base current to sink transisor 368 which again will sink a portion of the current generated by transistor 314. The cooperative action of transistor 342, 346 and 368 maintain the potential across the capacitance 10 at a value approximately equal to the potential $V_6$ occurring at junction 396. The potential across capacitance 10 produced by the action of the RPM signal generator 14 as a function of time is shown on FIG. 5 as waveform 438.

The circuit is arranged so that the potentials $V_4$ and $V_5$ at junctions 362 and 382 with transistors 350 and 370 in the conductive state respectively, is higher than the potential $V_6$. When the signal at terminal 178 is low, blocking transistor 370, the potential $V_5$ at junction 382 may be lower than the potential $V_4$ at 362 as indicated by the solid portion of the curve or may be a potential intermediate $V_4$ and $V_6$ as shown by the dashed line entitled $V_5$ (Alternate). As is seen on the waveform, the potential across capacitance 10 varies as a function of time only. At idle engine speeds, the trigger signals occur relatively far apart and therefore, is displaced in time beyond $T_3$. As the engine speed increases, the time between trigger pulses decreases and the time $T_4$ at which the Flip-Flop 104 changes state is displaced towards the left in the waveforms shown on FIG. 5. At intermediate speeds the time $T_4$ at which the flip-flop 104 changes state is displaced in between $T_2$ and $T_3$ so that at the time that the signal is transferred from $C_{10}$ to $C_{12}$, in response to a charge transfer signal, the potential across the capacitor 10 is approximately equal to $V_5$. As the engine speed further increases to a high speed mode of operation, $T_4$ may be displaced to fall between $T_1$ and $T_2$ so that at the time of the charge transfer, the charge on capacitor 10 will be approximately equal to $V_4$. In this way, the potential across $C_{10}$ which is subsequently transferred to $C_{12}$ is variable as a function of the engine's speed.

Figure 7:
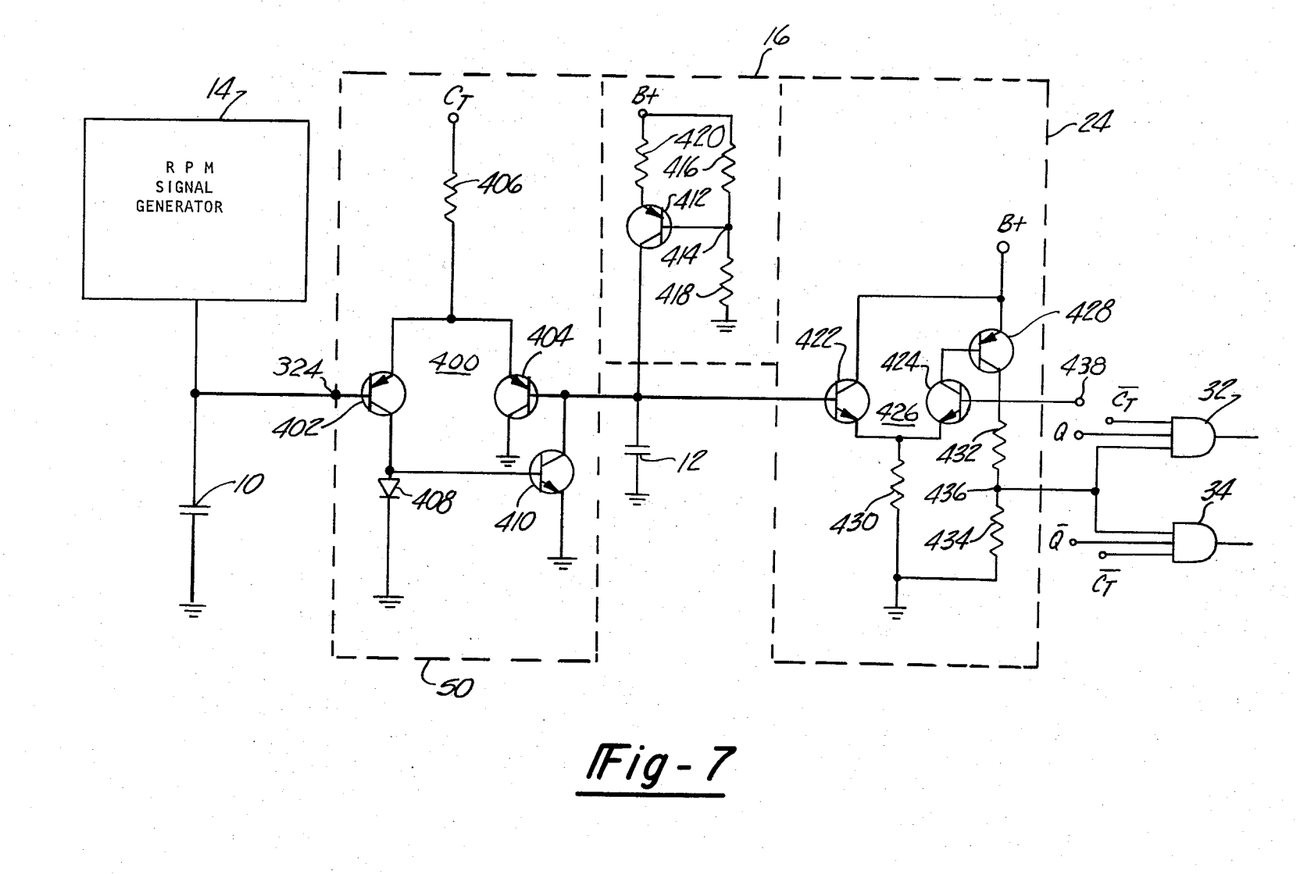
FIG. 7 is a circuit diagram of the charge transfer circuit, the ramp signal generator and the comparator.

The details of the charge transfer circuit 50, the ramp signal generator 16 and the comparator 24 are shown on the circuit diagram of FIG. 7. As previously described, the RPM signal generator 14 in response to the signals generated by the switch signal generator 20 causes a potential to be developed across capacitor 10 which is indicative of the engine speed. The electrode of capacitor 14 is connected to the base of a transistor 402 which in combination with transistor 404 forms a comparator 400 of the type disclosed in my Application Ser. No. 729,317. The emitters of transistors 402 and 404 are connected together and to a terminal designated $C_T$ and receives the charge transfer signal through a resistance 406. The collector of transistor 402 is connected to ground through a diode 408 and to the base of a transistor 410. The collector of transistor 404 is connected directly to ground and the base is connected to the collector of transistor 410 and to the electrode of capacitance 12 receiving a current signal from the ramp signal generator 16. The other electrode of capacitance 12 is connected to ground. The emitter of transistor 410 is also connected to ground.

The ramp signal generator 16 comprises a source transistor 412 having its base connected to a junction 414 between resistance 416 and 418 forming a voltage divider network between B+ and ground. The emitter of transistor 412 is connected to B+ through a resistance 420 and the collector of transistor 412 is connected to the junction between the base of transistor 404 and the one electrode of capacitance 12. The circuit comprising of source transistor 412 and resistances 416, 418 and 420 is a constant current source of the known type and is operative to charge capacitance 12 at a fixed rate. The output current of the ramp signal generator may be a constant value as indicated by the circuit shown on FIG. 7. However, as taught in my prior U.S. Pat. No. 3,919,981 issued on Nov. 18, 1977 or by Luchaco et al in U.S. Pat. No. 3,971,354 issued July 27, 1976, the current may be variable at a function of engine manifold pressure, engine temperature or a combination thereof or any other variable indicative of a full load may be used to vary the quantity of fuel being delivered to the engine.

The electrode of capacitance 12 being charged by the ramp signal generator 16 is connected to the base of a transistor 422 which in combination with transistor 424 forms a comparator 426. The emitters of transistors 422 and 424 are connected together and to ground through a resistance 430. A signal indicative of the engine's loads, such as the manifold pressure is communicated to terminal 438, which is connected to the base of transistor 424. The collector of transistor 424 is connected to the base of transistor 428, having its emitter connected directly to B+. The collector of transistor 428 is connected to ground through a voltage divider network comprising resistance 432 and 434. The junction 436 between resistances 432 and 434 is connected to the inputs of AND gates 32 and 34. The AND gates also receive signals indicative of the Q and $\overline{Q}$ signals and the $\overline{C_T}$ signal generated by the inverter amplifier 52, shown in FIG. 3.

The operation of the charge transfer circuit, the ramp signal generator circuit and the comparator are discussed with reference to FIG. 7 and the waveforms on FIG. 5. In the absence of a charge transfer signal at the terminal designated $C_T$, the potential at the base of transistor 402 is the potential across capacitance 10 and the potential applied to the base of transistor 404 is the potential across capacitance 12. Normally, the potential across capacitor 12 is much higher than the potential across capacitance 10 so that when the emitters of transistors 402 and 404 are made positive by a $C_T$ signal, transistor 402 preferentially conducts applying a base current to transistor 410. Transistor 410 responds to the conductance of transistor 402 and discharges capacitor 12 towards ground. When the potential across capacitor 12 decays to a value approximately equal to the value across capacitor 10, transistor 404 starts to preferentially conduct, terminating the conductance of transistors 402 and 410 which terminates the discharging of capacitor 12. Although the capacitor 12 continues to receive a charging current from the ramp signal generator, the operation of the comparator 400 in combination with transistor 410 maintains the potential on capacitor 12 approximately equal to the potential on capacitor 10 as long as the charge transfer signal is present at terminal $C_T$. Termination of the charge transfer signal deactivates transistors 402 and 404 and thereafter, the capacitor 12 is charged by the ramp signal generator 16.

The ramp signal generator is a current source consisting of transistor 412 and resistance 416, 418 and 420, which provide a constant current operative to charge capacitance 12 to a potential significantly higher than the maximum transferred potential.

The charge on capacitor 12 is monitored by the comparator 426 which also receives an input at terminal 438 indicative of the engine load such as the absolute manifold pressure. The engine load signal is applied to the base of transistor 424. When the potential across capacitance 12 applied to the base of transistor 422 is less than the potential of the engine load signal applied to the base of transistor 424, transistor 424 preferentially conducts providing base current for transistor 428. When transistor 428 conducts, the B+ potential is supplied across the voltage divider network consisting of resistances 432 and 434 and an intermediate potential is generated at the junction 436. At a time $T_5$, after the termination of the charge transfer signal, the potential across capacitance 12 equals the potential of the load signal applied to the base of 424 and transistor 422 starts to conduct. The conductance of transistor 422 increases the potential across resistance 430 which blocks transistor 424. The blocking of transistor 424 backbiases transistor 428 terminating the current flow through the voltage divider network consisting of resistances 432 and 434. With the current flow through resistances 432 and 434 terminated, the potential at the junction 436 assumes a ground potential.

The potential at juncture 436 is applied to the inputs of AND gates 32 and 34 along with the Q and $\overline{Q}$ and the $\overline{C}_T$ signals. The ramp signal 440 generated across capacitance 12 and the square wave signal 442 generated at juncture 436 are shown on FIG. 5. The Q and $\overline{Q}$ signals determine which of the two AND gates 32 and 34 respectively will be enabled, while the $\overline{C}_T$ signal applied to the AND gates 32 and 34 disable the AND gates during the generation of the charge transfer signal. The output of AND gates 32 and 34 are a series of square wave pulses 444 and 446 respectively and are indicative of the engine's fuel requirements. These pulses shown on FIG. 5 occur alternately at the outputs of AND gates 32 and 34 as shown. The signals 444 and 446 generated at the outputs of AND gates 32 and 34 are shorter than the square wave signal 442 generated at juncture 436 by a factor equal to the time duration of the charge transfer pulse $C_T$. The $\overline{C}_T$ signal effectively delays the beginning of pulses 444 and 446 so that their leading edges are synchronized with the beginning of the charging of capacitance 12 by the ramp signal generator 16. This eliminates any errors in the duration of the fuel injection pulses which may be caused by variations in the duration of the charge transfer pulse signal.

Having described the invention with regards to a specific preferred embodiment, it is not intended that the invention be limited to the circuits illustrated in the figures and described in the specification. It is known that a person in the art could devise alternate circuits capable of performing the same functions without departing from the spirit of the invention.

What is claimed is:

1. In combination with an internal combustion engine having means for generating trigger signals indicative of at least two diametrically opposite rotational positions of the engine's crankshaft, a sensor generating a load signal having a value indicative of the engine's load, and at least one electrically actuated fuel injector valve for delivering fuel to the engine in response to an injection signal, an electronic fuel control system for generating injection signals comprising:

RPM signal generator means for generating in a first interval between two successively generated trigger signals a first signal, said first signal having a value variable as a predetermined function of time;

a first capacitor for storing said first signal and generating an RPM signal having a value varying with the value of said first signal;

a second capacitor for storing, in a second interval between two successive trigger signals, a sum signal having a value indicative of said RPM signal at the end of said first interval plus the integrated sum of a second signal;

switch signal generator means for generating transfer signals in response to said trigger signals, said transfer signals having a predetermined pulse width small compared to the interval between successive trigger signals;

first comparator means for comparing the value of the RPM signal stored by said first capacitor with the value of the sum signal stored by said second capacitor in response to said transfer signal to generate a discharge signal when the value of said RPM signal is smaller than the value of said sum signal;

discharge circuit means for discharging said second capacitor in response to said discharge signal to decrease said sum signal to a value equal to the value of said RPM signal;

first ramp signal generator means for generating said second signal, said second signal increasing, during said second interval, the value of the signal stored in said second capacitor at a predetermined rate;

second comparator means receiving the load signal and said sum signal for generating said injection signal having a pulse duration equal in time to the time between the initiation of the transfer signal and the time the value of said sum signal equals the value of said load signal; and gate means disabled by said transfer signal for transmitting said injection signals to said at least one injector valve, the disabling of said gate means limiting the duration of said transmitted injection signals to a duration equal to the time it takes said ramp signal to increase the value of said sum signal from the value of said RPM signal to the value of said load signal.

2. The combination of claim 1 wherein said switch signal generator means further includes means for generating at least two timing signals in synchronization with said trigger signals; said included means generating a first timing signal in response to said trigger signal, said first timing signal having a predetermined pulse duration and generating a second timing signal after the termination of said first timing signal; and wherein said RPM signal generator generates said first signal having a first predetermined value during said first timing signal and changing to a second predetermined value during said second timing signal.

3. The combination of claim 2 wherein said second timing signal has a predetermined pulse duration, said switch signal generator means further includes means for generating a third timing signal after the termination of said second timing signal; and wherein the value of said first signal changes to a third predetermined value in response to said third timing signal.

4. The combination of claim 3 wherein the load sensor is a pressure sensor generating a signal having a value indicative of the pressure in the engine's air intake manifold.

5. The combination of claim 3 wherein said switch signal generator means comprises:

second ramp generating means for generating a ramp signal in response to said trigger signals, said ramp signal increasing as a function of time in the interval between successive trigger signals and being reset to a predetermined fixed value by each trigger signal, first comparator means for generating said transfer signal when the value of said ramp signal is less than a fourth predetermined value, second comparator means for generating a first comparator signal when the value of said ramp signal is less than a fifth predetermined value and a second comparator signal when the value of said ramp signal exceeds said fifth predetermined value;

third comparator means for generating a third comparator signal when the value of said ramp signal exceeds a sixth predetermined value;

first amplifier means for generating a first output signal having a first polarity in response to said first comparator signal, and a second polarity in the absence of said first polarity signal;

second amplifier means, receiving said second and third comparator signals for generating a second output signal, said second output signal having said second polarity in the absence of said second and third comparator signals, and said first polarity in resonse to said second comparator signal, and returning to said second polarity in response to said third comparator signal;

wherein:

said first timing signal is said first output signal having said first polarity and said second output signal having said second polarity, said second timing signal is said first output signal having said second polarity and said second output signal having said first polarity, and said third timing signal is said first and second output signals having said second polarity.

6. The combination of claim 5 wherein said first signal generator means comprises:

reference signal generator means responsive to said first and second output signals for generating a reference signal, said reference signal having a value equal to said first value in response to said first timing signal, a value equal to said second value in response to said second timing signal, and a value equal to said third value in response to said third timing signal;

a current source generating a current to charge said first storage means at a predetermined rate.

comparator means comparing the value of the charge on said first storage means with said reference signal for generating a first sink signal when the value of the charge on said first capacitance exceeds the value of said reference signal; and a current sink for discharging said first capacitance in response to said first sink signal wherein said comparator means and said current sink cooperate to maintain the charge on said first capacitance at a value equal to the value of said reference signal.

7. The combination of claim 6 wherein said first signal generator further includes means for receiving said transfer signal, said means for receiving operative to disable said current source and current sink during the period said transfer signal is being generated holding the value of the charge on the first storage means constant.

8. The combination of claim 1 wherein said at least one injector valve is two groups of fuel injector valves;

said switch signal generator means further includes means for generating sequence signals alternating in value in timed relationship with said trigger signals; and wherein said gate means is enabled by said sequence signals to transmit said injection signals to said two groups of injector valves, one group at a time, in an alternating sequence.

9. The combination of claim 8 wherein:

said included means for generating sequence signals is a bi-stable flip-flop circuit having complementary outputs, said bi-stable flip-flop circuit switching from one stable state to the other in response to said trigger signals, wherein said sequence signals are the two complementary output signals of said bi-stable flip-flop circuit; and, said gate means is two AND gates, one of said AND gates receiving said injection signals and enabled by one of said two complementary output signals, and the other AND gate receiving said injection signals and enabled by the other of said complementary output signals, both of said gate means further receiving said transfer signals and are disabled thereby.

10. A control system for producing an output signal indicative of the combination of two independent variables comprising:

first means for cyclically generating a first signal having a value indicative of the value of a first independent variable;

second means for cyclically generating a second signal having a value increasing at a predetermined rate;

means for generating a start cycle signal at the beginning of each cycle, said start cycle signal having a pulse width small compared to the time duration of each cycle;

first comparator means for comparing said first signal to said second signal in response to said start cycle signal to generate an error signal when said second signal is larger than said first signal;

means for decreasing the value of said second signal at the beginning of each cycle to the value of the first signal at the end of the preceding cycle in response to said error signal; and second means for comparing the absolute value of said second signal with the value of the second independent variable to generate an output signal having a pulse duration indicative of the time it takes from the beginning of each cycle for the absolute value of said second signal to equal the value of the second independent variable; and gate means disabled by said start cycle signal for subtracting from the beginning of said output signal a time equal to the duration of said start cycle signal to correct the pulse duration of said output signal thereby correcting the pulse duration of the output signal for the time error introduced during time when the second signal is being reduced to the value of said first signal.

11. The control system of claim 10 wherein the output signals are indicative of a control parameter of a rotary device and wherein one of independent variables is the rotary speed of said rotary device, said first means comprising:

third means for generating trigger signals at a predetermined rotational interval of said rotary device;

at least one signal source generating a third signal having a predetermined value;

storage means for storing said third signal between the occurrence of said trigger signals wherein the stored value of said third signal is said first signal and the cyclic operation of said first means is determined by rate at which said trigger signals are generated; and wherein said means for generating a start cycle signal generates said start cycle signals in response to said trigger signals.

12. The control system of claim 11 wherein said control parameter is a non-linear function of the device's rotary speed, said at least one signal source is a plurality of signal sources, wherein each of said plurality of signal sources generates signals having a value different from each other signal source; and further includes switch signal generator means for generating switch signals at predetermined intervals after the occurrence of each trigger signal, said switch signals operative to enable, one at a time, in a predetermined sequence each of said plurality of signal sources, wherein said first signal changes during each of said intervals as a function of the sequence in which said signal sources are enabled and the value of the signal being generated by the currently enabled signal source.

13. The control system of claim 12 wherein said rotary device is an internal combustion engine having a sensor generating a load signal indicative of the engine's load and at least one fuel injector valve delivering fuel to the engine in response to injection signals, wherein said means for generating trigger signals is a sensor detecting predetermined rotational position of said engine; and said second means for comparing, compares the absolute value of said second signal with the load signal.

14. The control system of claim 13 wherein said at least one fuel injector valve is two groups of injector valves, wherein each group has at least one injector valve;

said means for generating trigger signals generates trigger signals for two rotational positions of the engine 180° apart, and where said system further includes:

means for generating sequence signals distinguishing the rotational intervals between said two rotational positions; and wherein said gate means is enabled by said sequence signals to transmit said output signal to each of said groups of fuel injector valves in an alternating sequence.

15. In combination with an electronic fuel control system for an internal combustion engine of the type having:

means for generating trigger signals indicative of at least two rotational intervals of the engine;

a sensor generating a load signal indicative of the engine's load;

sequence signal generating means for generating sequence signals in response to said trigger signals, said sequence signals having a first state identifying one of the two rotational intervals and a second state identifying the other rotational interval;

RPM signal generating means for generating an RPM signal having a value variable as a function of time;

ramp signal generator means for generating a ramp signal;

a first and a second capacitor receiving said RPM and ramp signals and responsive to said sequence signals for generating sum signals indicative of the sum of the RPM and ramp signals generated in sequential rotational intervals;

first comparator means comparing said sum signals with said load signals during each rotational interval for generating injection signals having a pulse duration equal to the time said sum signals have a value less than said load signal during each rotational interval; and at least one fuel injector valve for delivering a quantity of fuel to the engine in response to said injection signals;

an improvement comprising:

switch means for generating a transfer signal in response to each trigger signal;

means for transmitting said RPM signal to said first capacitor during each rotational interval;

second comparator means responsive to said transfer signal for comparing the value of the RPM signal stored by said first capacitor with the value of the signal stored by said second capacitor to generate an error signal when the value of the signal stored by said second capacitor is larger than said RPM signal;

means for discharging said second capacitor to the value of said RPM signal in response to said error signal, said second comparator means and means for discharging cooperating to hold the value of the signal stored by said second capacitor at a value equal to the signal stored by said first capacitor during the interval said error signal is being generated;

means for transmitting said ramp signal to said second capacitor during each rotational interval to generate said sum signal which is compared with said load signal by said first comparator to generate said injection signals; and gate means responsive to said transfer signals for subtracting from the beginning of each injection signal a time interval equal to the duration of said transfer signal to correct the pulse duration of said injection signal for the time said second capacitor is being held at a value equal to signal stored by said first capacitor by said means for discharging.

16. The improvement of claim 15 wherein said at least one fuel injector valve is two groups of injector valves, wherein each group has at least one injector valve, said gate means further transmits said injection signals to said groups of injector valves, one group at a time in an alternating sequence in response to said sequence signals.

17. In a fuel control system for an internal combustion engine having an electronic control unit generating output signals indicative of the engine's fuel requirements in response to measured engine operating parameters and at least one fuel injector valve delivering fuel to the engine in response to said output signals, and wherein said electronic control unit has a first capacitor storing a first signal indicative of a first measured parameter, transfer means for transferring said first signal to a second capacitor in response to a transfer signal having a fixed time duration, means for increasing the value of the first signal transferred to the second capacitor at a predetermined rate, and means for generating said output signal having a pulse duration equal to time required for the increasing signal stored by said second capacitor to equal a value indicative of a second engine operating parameter, an improvement to said fuel control system comprising:

gate means receiving said output signal and said transfer signals for subtracting the fixed time duration of said transfer signal from said output signal to correct said output signal for the duration time error introduced during the transfer of said first signal from said first capacitor to said second capacitor.

18. The improvement of claim 17 wherein said at least one injector valve is two groups of injector valves and said fuel control system further generates sequence signals alternating between a first and second value in timed relationship with the rotation of the engine and said sequence signals are indicative of an alternating sequence in which the two groups of injector valves are to supply fuel to the engine, said gate means comprises:

a first electronic gate disabled by said transfer signal and enabled by the sequence signals having said first value for transmitting said output signals to one of said two groups of injectors; and a second electronic gate disabled by said transfer signal and enabled by the sequence signals having said second value for transmitting said output signals to the other of said two groups of injectors.

* * * * *